United States Patent
Desai et al.

(10) Patent No.: US 9,451,325 B2
(45) Date of Patent: Sep. 20, 2016

(54) SYSTEM AND METHOD FOR TARGETED ADVERTISING

(71) Applicants: Samarth Desai, Nashua, NH (US); Rishi Kachrani, Nashua, NH (US); Shefali Mangtani, Nashua, NH (US); Elisha Shah, Nashua, NH (US); Sahil Shah, Nashua, NH (US)

(72) Inventors: Samarth Desai, Nashua, NH (US); Rishi Kachrani, Nashua, NH (US); Shefali Mangtani, Nashua, NH (US); Elisha Shah, Nashua, NH (US); Sahil Shah, Nashua, NH (US)

(*) Notice: Subject to any disclaimer, the term of this patent is extended or adjusted under 35 U.S.C. 154(b) by 61 days.

(21) Appl. No.: 14/231,670

(22) Filed: Mar. 31, 2014

(65) Prior Publication Data
US 2015/0281776 A1 Oct. 1, 2015

(51) Int. Cl.
| H04N 7/10 | (2006.01) |
|---|---|
| H04N 21/458 | (2011.01) |
| G06Q 30/02 | (2012.01) |
| H04N 21/81 | (2011.01) |
| H04N 21/45 | (2011.01) |
| H04N 21/44 | (2011.01) |
| H04N 21/43 | (2011.01) |
| H04N 21/442 | (2011.01) |
| H04N 21/475 | (2011.01) |
| H04N 21/2668 | (2011.01) |

(52) U.S. Cl.
CPC ........ *H04N 21/458* (2013.01); *G06Q 30/0255* (2013.01); *G06Q 30/0264* (2013.01); *G06Q 30/0269* (2013.01); *H04N 21/2668* (2013.01); *H04N 21/4302* (2013.01); *H04N 21/4307* (2013.01); *H04N 21/44008* (2013.01); *H04N 21/44204* (2013.01); *H04N 21/44222* (2013.01); *H04N 21/4532* (2013.01); *H04N 21/4755* (2013.01); *H04N 21/812* (2013.01)

(58) Field of Classification Search
CPC .......... H04N 21/812; H04N 21/4532; H04N 7/17318; H04N 21/44222; H04N 21/25891; H04N 21/235; H04N 21/435; H04N 7/165
USPC .............................. 725/34–36; 709/217–232
See application file for complete search history.

(56) References Cited

U.S. PATENT DOCUMENTS

| | | | | |
|---|---|---|---|---|
| 6,029,045 A * | 2/2000 | Picco | ...................... | H04N 7/165 348/E5.002 |
| 6,133,912 A * | 10/2000 | Montero | ................ | G06Q 30/02 348/558 |
| 6,264,560 B1 * | 7/2001 | Goldberg | ............. | G06Q 20/387 348/E7.071 |
| 6,712,702 B2 * | 3/2004 | Goldberg | ............. | G06Q 20/387 348/E7.071 |
| 6,718,551 B1 * | 4/2004 | Swix | ....................... | G06Q 30/02 348/E7.075 |
| 6,850,252 B1 * | 2/2005 | Hoffberg | ............ | G06K 9/00369 348/E7.061 |
| 7,493,636 B2 * | 2/2009 | Kitsukawa | ........... | G06Q 20/387 705/14.26 |
| 7,630,986 B1 * | 12/2009 | Herz | ....................... | G06Q 10/10 |
| 8,352,981 B1 | 1/2013 | Oztaskent | | |
| 8,352,983 B1 * | 1/2013 | Chane | ................ | H04N 5/44543 348/563 |
| 8,595,770 B2 * | 11/2013 | Tatem | ................ | H04N 21/2143 725/39 |
| 8,645,991 B2 * | 2/2014 | McIntire | ............ | H04N 7/17318 725/34 |
| 8,850,473 B2 * | 9/2014 | Sheehan | ............ | H04N 21/2221 705/14.4 |
| 2002/0107940 A1 * | 8/2002 | Brassil | ................ | H04N 21/222 709/219 |

(Continued)

*Primary Examiner* — Annan Shang
(74) *Attorney, Agent, or Firm* — Beacon Patent Intelligence LLC; Eugene H. Nahm

(57) ABSTRACT

System and method for transmitting targeted advertisement is provided. The system and method relates audiences and merchants closely to effectively deliver the advertisement to an optimum target audience. A set-top box analyzes a scheduled advertisement broadcasted with a regular programming from a cable box by intercepting the signals. The scheduled advertisement's start time and duration is identified from video fingerprinting to synchronize targeted advertisements. The targeted advertisement is transmitted in conjunction with the scheduled advertisement.

19 Claims, 4 Drawing Sheets

(56) References Cited

U.S. PATENT DOCUMENTS

| | | | | |
|---|---|---|---|---|
| 2002/0194589 A1* | 12/2002 | Cristofalo | H04N 7/165 | 725/32 |
| 2004/0236607 A1* | 11/2004 | Kost | G06Q 10/10 | 705/2 |
| 2005/0166224 A1* | 7/2005 | Ficco | H04H 20/106 | 725/35 |
| 2007/0276726 A1* | 11/2007 | DiMatteo | G06Q 30/02 | 725/34 |
| 2008/0034113 A1* | 2/2008 | Montero | G06Q 30/02 | 709/238 |
| 2009/0094640 A1* | 4/2009 | Anderson | H04N 7/17318 | 725/34 |
| 2009/0183221 A1* | 7/2009 | Klein | H04N 7/17318 | 725/131 |
| 2010/0241510 A1* | 9/2010 | Zhang | G06Q 30/0246 | 705/14.45 |
| 2010/0257553 A1* | 10/2010 | Yuen | G06Q 30/02 | 725/36 |
| 2011/0138414 A1* | 6/2011 | Koren | H04N 21/23424 | 725/35 |
| 2011/0179445 A1* | 7/2011 | Brown | G06Q 30/02 | 725/32 |
| 2012/0023522 A1* | 1/2012 | Anderson | G06Q 30/02 | 725/35 |
| 2012/0036015 A1* | 2/2012 | Sheikh | G06Q 30/02 | 705/14.54 |
| 2013/0036015 A1* | 2/2013 | Bender | G06Q 30/02 | 705/14.66 |
| 2013/0073389 A1* | 3/2013 | Heath | G06Q 50/01 | 705/14.54 |
| 2013/0339146 A1* | 12/2013 | Goldberg | G06Q 30/02 | 705/14.53 |
| 2014/0100959 A1* | 4/2014 | Patel | G06Q 30/0205 | 705/14.58 |
| 2014/0150021 A1* | 5/2014 | Subramanian | H04N 21/8358 | 725/36 |
| 2014/0331119 A1* | 11/2014 | Dixon | H04L 63/168 | 715/234 |
| 2015/0149277 A1* | 5/2015 | Mankoff | G06Q 30/0261 | 705/14.45 |

* cited by examiner

SYSTEM AND METHOD FOR TARGETED ADVERTISING

BACKGROUND

1. Field of the Invention

The subject matter described herein relates generally to information distribution technology. More particularly, the present invention relates to transmitting advertisements to targeted audience through television broadcasting.

2. Description of Related Art

Advertising on television is expensive and quite ineffective for small businesses because it is difficult to target the right audience. Small businesses invest significant amount of resources to create an advertisement and to air it to the public. Even when small businesses can come up with such resources, it is often not targeted enough to allow for a good return on the investment.

Currently, small businesses often use bulk mailing in order to reach targeted audiences in an optimum area at a lower cost. However, through this method the hit rate is still low, since many people simply throw away the letters they receive. Therefore, such advertising method is ineffective.

The receiving audience faces similar problem of untargeted advertisements. While watching TV, they are normally shown advertisements that are not relevant to them. For example, vegetarian families receive TV advertisements relating to meat products or non-vegetarian restaurants; cat owners see dog-related advertisements. In turn, neither the audience nor the merchants benefit from such advertisements.

Therefore, what is needed is a system and method that effectively target audiences receiving advertisements both to benefit the audience and the merchants.

SUMMARY

The subject matter of this application may involve, in some cases, interrelated products, alternative solutions to a particular problem, and/or a plurality of different uses of a single system or article.

In one aspect, a system for transmitting a targeted advertisement to an audience is provided. The system may comprise a cable box configured to generate signals for a regular programming where a scheduled advertisement may be a portion thereof. The broadcasting station may generate such signals. The cable box may be in communication with a display unit for displaying the generated signals. Further, the system may comprise a set-top box which may generate signals for the targeted advertisement to be displayed on the display unit. The set-top box may be in communication with the cable box.

The set-top box may further comprise a video analyzer which may synchronize a start time, a duration, and a position, of the targeted advertisement with the scheduled advertisement. The system may further comprise an ad decision module in communication with the set-top box. The set-top box may be configured to assign a merchant advertisement from a plurality of merchant advertisement inputs stored in the ad decision module, to the targeted advertisement, based on at least one of: time, an audience preference, a merchant preference, an audience viewing habits, the regular programming, and the scheduled advertisement.

In another aspect, a method for providing a targeted advertisement to an audience is disclosed. The method may begin with identifying a start time and a duration of a scheduled advertisement where the scheduled advertisement may be broadcasted from a broadcasting station. An audience preference may be identified, followed up by assigning the targeted advertisement with a merchant advertisement, where the merchant advertisement may be selected from a plurality of merchant advertisement inputs. The selection may be based on the audience preference. Once selected, the targeted advertisement's start time and duration may be synchronized with the scheduled advertisement. Finally, the synchronized assigned targeted advertisement may be displayed on a display unit.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a system and method for targeted advertising. The present invention provides a system and method that enables local business to utilize television advertising at a lower cost and with higher efficiency by selecting the audience of the advertisement. The system provided herein is developed in conjunction with the currently available cable television set-up.

In general, the system for transmitting a targeted advertisement to an audience may comprise one or more processors, a computer readable storage medium, and one or more programs. The one or more programs may be stored in the computer readable storage medium causing the system to execute the one or more programs for performing multiple functions in conjunction with the system. The one or more program may comprise instruction that, when executed, presents an audience and a merchant to provide advertisement through a display unit in a more specific and targeted manner.

Figure 1:
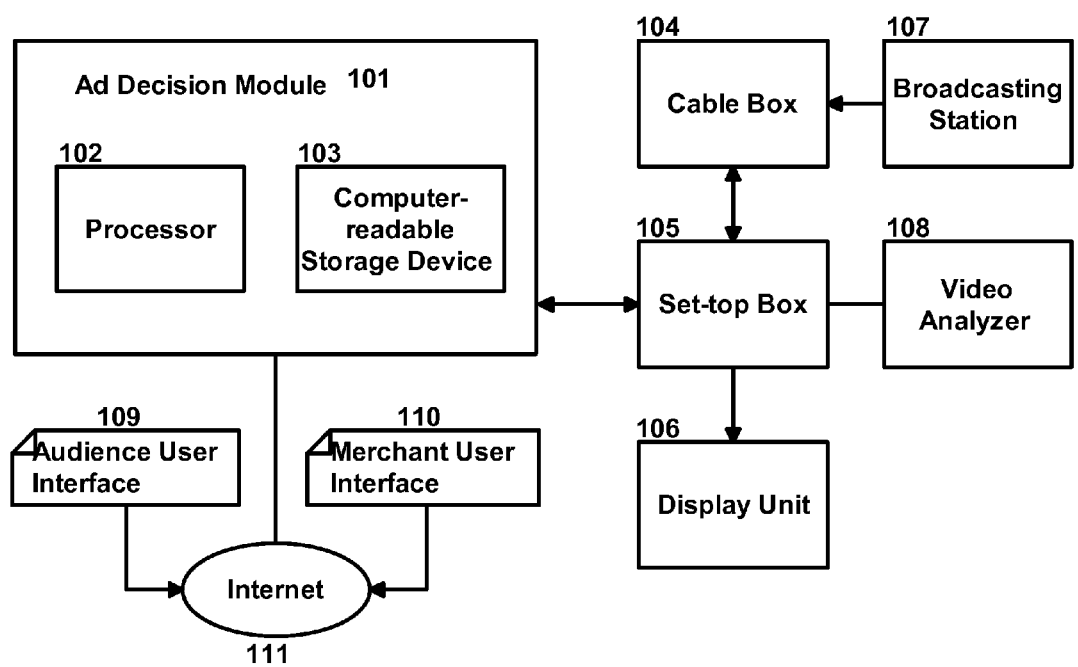
FIG. 1 provides an embodiment of the system for transmitting a targeted advertisement to an audience.

FIG. 1 illustrates an embodiment of the system for transmitting a targeted advertisement to an audience. In this embodiment, the system comprises a cable box 104 communicating with a set-top box 105, where the set-top box 105 may modify a scheduled advertisement originating from a broadcasting station 107 to generate the targeted advertisement. A display unit 106 may visually present to the audience the targeted advertisement. The set-top box 105 may further comprise a video analyzer 108. The video analyzer 108 may analyze the scheduled advertisement incoming from the cable box 104 to determine a start time and a duration of the scheduled advertisement. The set-top box 105 may be in communication with an ad decision module 101. The ad decision module 101 may comprise one or more processors 102 and computer-readable storage device or medium 103. The ad decision module 101 may be networked through the internet 111 where an audience user interface 109 and a merchant user interface 110 are presented. The audience and the merchant may have access to the user interface 109 110 by employing a computing device.

The computing device may include, but are not limited to, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Further, the display unit contemplated herein may include, but are not limited to, LED screen, LCD screen, Plasma screen, touchscreen, proximity sensor-enabled screen, and the like. The display unit may further include devices such as a computer, laptop, televisions or any other similar devices that are capable of displaying a video stream or an image on a screen.

The cable box may receive signals for a regular programming transmitted from the broadcasting station. The regular programming may include, but are not limited to, sports games, television shows, movies, and the similar television content. Among other things, the regular programming may comprise the scheduled advertisement. The scheduled advertisement may be an original series of advertisements presented to the audience in between and/or throughout the regular programming.

The set-top box may be configured to generate signals for the targeted advertisement displayable on the display unit. In one embodiment, the set-top box may comprise a video analyzer. The video analyzer may detect a start time, duration, and a video fingerprinting of the scheduled advertisement. Such information may be constantly updated by monitoring a broadcasting schedule available from the broadcasting station.

In one embodiment, the video analyzer may determine a start time and a duration of the scheduled advertisement in order to plan when the targeted advertisement may be transmitted to the audience.

In another embodiment, the video analyzer may determine a position of the targeted advertisement on the display unit. The position may be configured such that the targeted advertisement may overlay on top of the scheduled advertisement without blocking or distracting the scheduled advertisement significantly.

The ad decision module may be in communication with the set-top box to select which merchant advertisement is to be assigned to the targeted advertisement from a multiple merchant advertisement inputs submitted by the merchants to the ad decision module. The merchant advertisement refers to a specific advertisement from each merchant, whereas the targeted advertisement refers to an advertisement that is to be displayed on the display unit.

In one embodiment, the merchant advertisement may be selected based on time. Depending on time of a day, time of a season, time of a week, and the like, certain goods and services may be time-sensitive and appealing to the audience. By way of example, merchant advertisements belonging to restaurants may be more effective when presented to the audience close or during lunch or dinner time.

In another embodiment, the merchant advertisement may be selected based on an audience preference. The audience preference may comprise an audience location and an audience interest. The audience may set the audience interest identifying types of goods or services that the audience is interested in. In this way, the audience may defer advertisements that may not be relevant to the audience. Similarly, the merchant would be able to present the merchant advertisement to the audience who are more likely to purchase the services or goods being provided by the merchant.

In yet another embodiment, the merchant advertisement may be selected based on an audience location. The audience location would enable the system to deliver location-sensitive advertisements, such as weather related goods or services, food deliveries, or local event information.

The merchant advertisement may also be selected based on a merchant preference. The system for transmitting a targeted advertisement disclosed herein is not only designed to benefit the audience but also to provide effective targeting of advertisement to the merchants.

In one embodiment, the merchant advertisement may be selected based on a merchant location. As such, the merchant location may enable the system to deliver the merchant advertisement to those audiences within a close proximity.

In another embodiment, the merchant may select a merchant target audience.

In yet another embodiment, the merchant may select a preferred time when the merchant advertisement to be transmitted to the audience. By way of example, such feature would be useful to merchants who are selling time-sensitive goods or services.

The merchant advertisement may be selected from the merchant advertisement inputs based on an audience viewing habits. The audience viewing habits may be recorded over time to analyze likes and dislikes of a particular audience. Thereby, providing more efficient targeted advertisement.

In one embodiment, an interaction between the audience and the cable box may be monitored, in order to determine the audience viewing habits. Such interaction may be observed from a frequency of the audience's viewing of a certain regular programming or a time of the audience viewing a certain regular programming. The audience viewing habits may be stored in the ad decision module.

The audience and the merchants may access and set up the aforementioned preferences by utilizing user interfaces linked to the ad decision module. The user interface may be accessed through a network such as the internet by a computing device. The merchants may also submit the merchant advertisement input utilizing the merchant user interface.

The type of merchant advertisement inputs may be of any type, including, but are not limited to, video, audio, text, text banners, and the like.

A method for providing the targeted advertisement to the audience in accordance with the system described above is provided.

Figure 2:
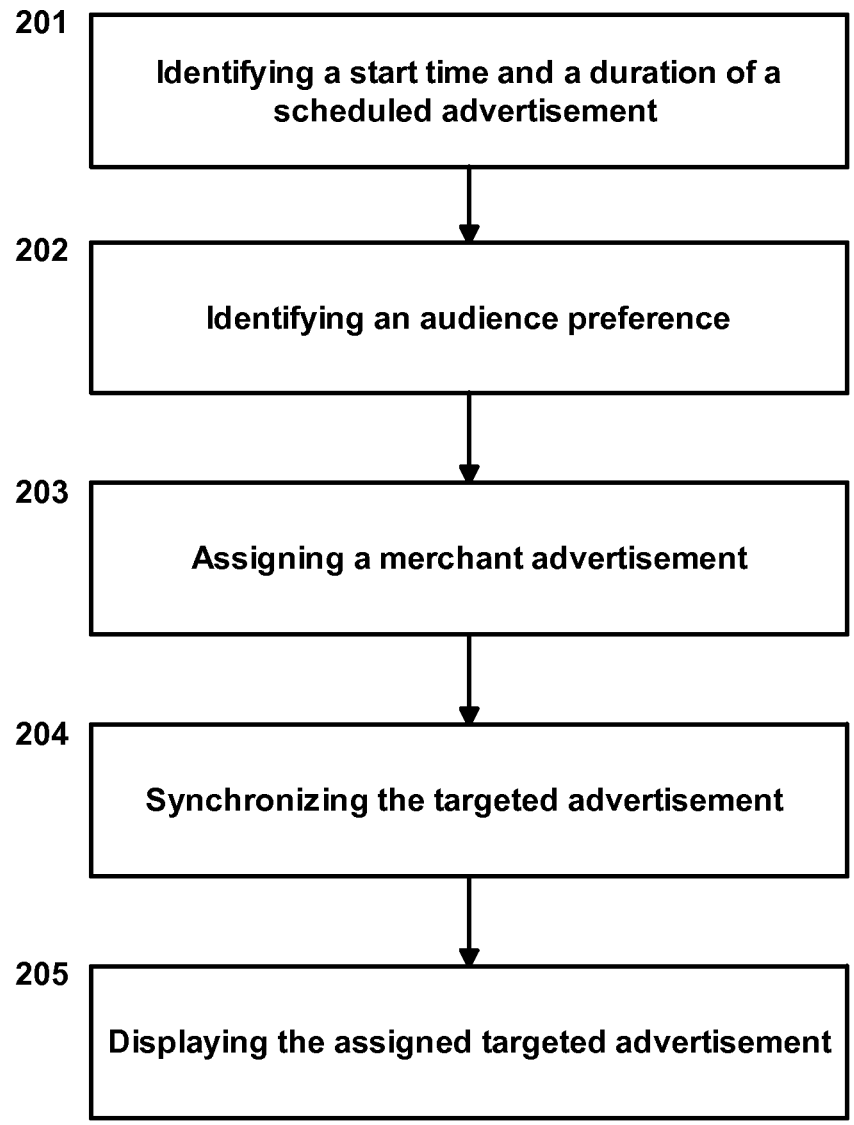
FIG. 2 provides an embodiment of the method for providing the targeted advertisement.

FIG. 2 illustrates an embodiment of the method for providing the targeted advertisement. At 201, the system identifies the start time and the duration of the scheduled advertisement. The audience preference may be identified 202, which may be the basis for assigning the merchant advertisement to the targeted advertisement 203. Once the merchant advertisement is selected from the plurality of merchant advertisement inputs from the merchants, the targeted advertisement may be synchronized to the scheduled advertisement 204. Once it is synchronized with the start time and the duration, the targeted advertisement may be displayed on the display unit.

In one embodiment, the targeted advertisement may replace the scheduled advertisement on the display unit.

In another embodiment, the targeted advertisement may be un-obstructively presented to the audience in conjunction with the scheduled advertisement.

In yet another embodiment, the targeted advertisement may be assigned with the merchant advertisement based on the scheduled advertisement. By way of example, if the scheduled advertisement is about a tooth brush, the merchant advertisement may be a tooth brush which is closely related to the product of the scheduled advertisement.

Figure 3:
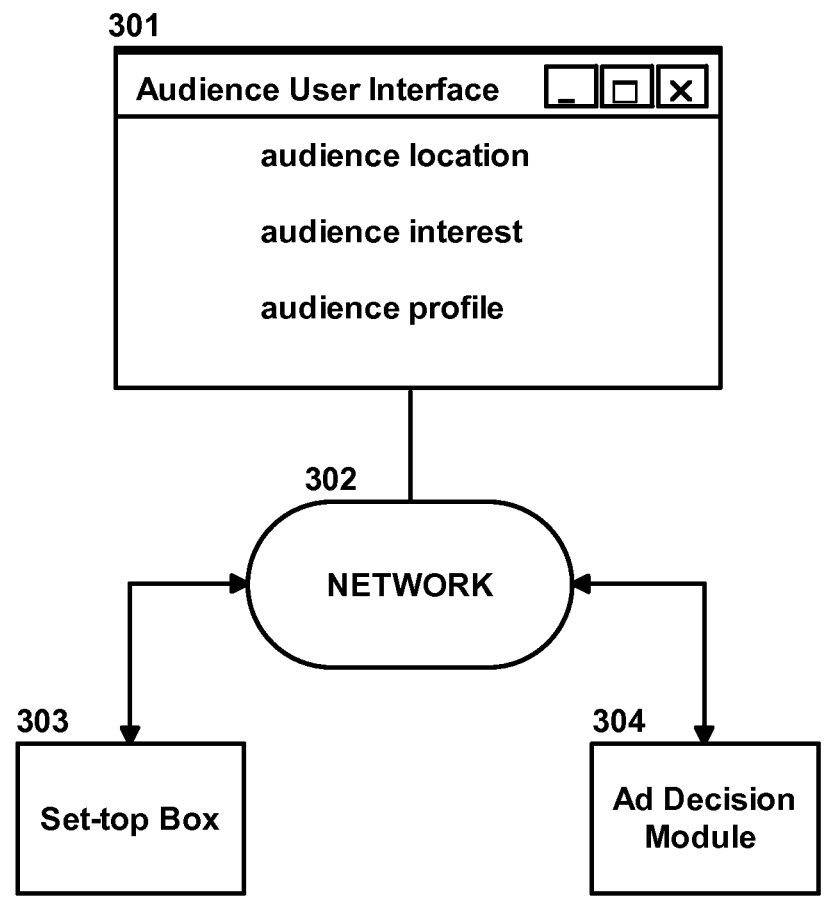
FIG. 3 provides an embodiment of the audience user interface.

FIG. 3 describes an embodiment of the audience user interface. The audience user interface 301 enables the audience to input the audience preference, the audience location, the audience interest, and an audience profile. The audience profile may be the audience demographic data, such as age, sex, occupation, and the like. These data inputted through the audience user interface may be utilized by the system or the merchant to transmit the targeted advertisement more effectively. The audience user interface 301, accessible by the computing device, may be communicating with the set-top box 303 and the ad decision module 304 through a network 302, such network may include but are not limited to, the internet, a private network, an intranet, a wide area network (WAN), a local area network (LAN), a Bluetooth wireless network, and the like.

Figure 4:
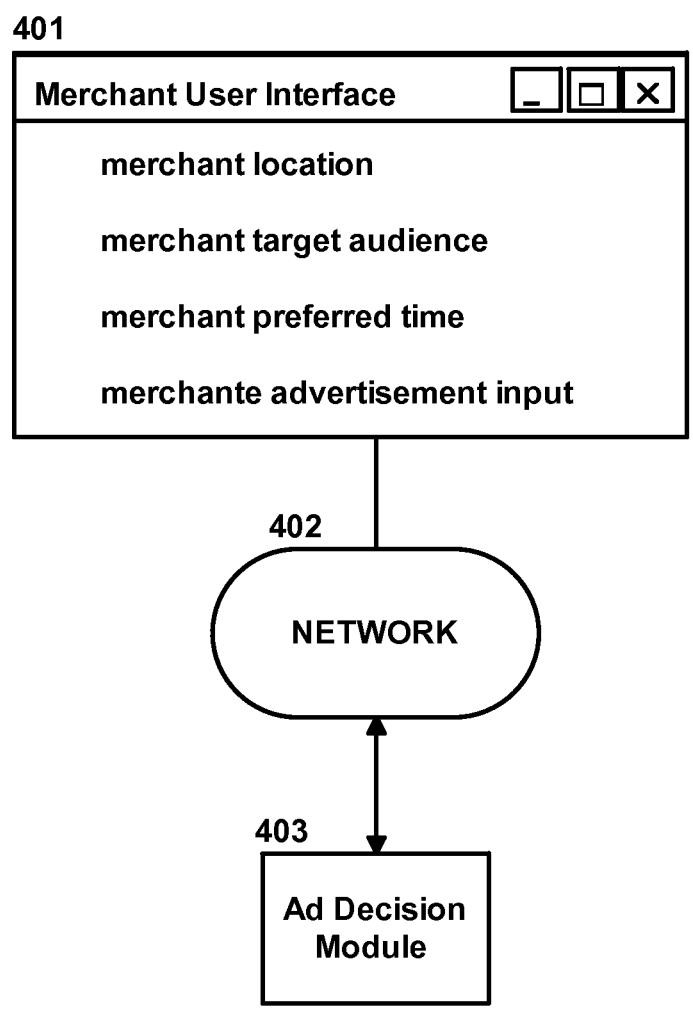
FIG. 4 provides an embodiment of the merchant user interface.

FIG. 4 describes an embodiment of the merchant user interface. Similar to the audience user interface, the merchant user interface 401 enables the merchant to input the merchant location, the merchant target audience, the merchant preferred time, and the merchant advertisement input. These data inputted via the merchant user interface may be utilized by the system or the audience to transmit the targeted advertisement more effectively. The merchant user interface 402 may be communicating with the ad decision module 403 and utilize it as the computer-readable storage medium.

The merchant may select to generate a coupon associated to the merchant advertisement. In one embodiment, the coupon may be issued in an electronic form being transmitted from the set-top box to the audience. The audience may receive the electronic form of the coupon via the computing device. The coupon may be stored in the ad decision module.

In another embodiment, the coupon may be selected based on the audience preference. By way of example, a coupon for a grocery store may be issued to an audience whose audience interest is set to cooking shows.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Those skilled in the art will readily observe that numerous modifications, applications and alterations of the device and method may be made while retaining the teachings of the present invention.

What is claimed is:

1. A system for transmitting a targeted advertisement to an audience comprising:
    a cable box configured to generate signals for a regular programming, wherein the regular programming comprises a scheduled advertisement, received from a broadcasting station, the cable box in communication with a display unit for displaying the generated signals;
    a set-top box, comprising at least one computer processor, configured to generate signals for the targeted advertisement to be displayed on the display unit, the set-top box in communication with the cable box; and the set-top box further comprising:
    a video analyzer synchronizing a start time and a duration, of the targeted advertisement with the scheduled advertisement, and the video analyzer identifying a product of the scheduled advertisement; and
    an ad decision module in communication with the at least one computer processor and at least one computer-readable storage medium, wherein the ad decision module is configured to assign a merchant advertisement, selected from a plurality of merchant advertisement inputs stored in the at least one computer-readable storage medium, to the targeted advertisement, the merchant advertisement being selected to be assigned to the targeted advertisement based on a merchant preference, audience preference, and the product of the schedule advertisement; wherein the merchant preference indicates a tendency of merchant's target audience, and wherein the merchant advertisement is selected to be assigned to the target advertisement if the ad decision module identifies a similarity between the product of the scheduled advertisement and a product of the merchant advertisement, by comparing the two products.

2. The system of claim 1 wherein the audience preference comprises at least one of an audience location, an audience profile, and an audience interest.

3. The system of claim 1 wherein the merchant preference comprises at least one of a merchant location, a merchant target audience, and a merchant preferred time to transmit the merchant advertisement to the audience.

4. The system of claim 1 wherein the targeted advertisement is selected by the ad decision module based on an analysis of the audience's viewing habit of the regular programming by monitoring the frequency of the audience viewing the regular programming.

5. The system of claim 1 further comprising an audience user interface operable to receive the audience preference.

6. The system of claim 1 further comprising a merchant user interface operable to receive the merchant preference and each of the plurality of merchant advertisement inputs.

7. The system of claim 1 wherein each of the plurality of merchant advertisements is text banners.

8. The system of claim 1 wherein the merchant advertisement is selected to be assigned to the targeted advertisement if the merchant preference of the merchant advertisement at least partially matches the audience preference.

9. A method that uses a set-top box comprising at least one computer processor, for providing a targeted advertisement to an audience, the method comprising the steps of:
    identifying a start time and a duration of a scheduled advertisement, the scheduled advertisement being broadcasted from a broadcasting station; identifying a product of the scheduled advertisement; identifying an audience preference; identifying a merchant preference for each of a plurality of merchant advertisement inputs, the merchant preference indicating a tendency of merchant's target audience;
    assigning the targeted advertisement with a merchant advertisement, wherein the merchant advertisement is selected from the plurality of merchant advertisement inputs, based on:
    the merchant preference; the audience preference; and the product of the scheduled advertisement, wherein the merchant advertisement is selected to be assigned to the target advertisement if the product of the scheduled advertisement is similar to a product of the merchant advertisement;

synchronizing the assigned targeted advertisement with the start time and the duration; and displaying the synchronized assigned targeted advertisement on a display unit.

10. The method of claim 9 wherein the step of displaying the synchronized assigned targeted advertisement on a display unit comprises positioning the synchronized assigned targeted advertisement on the display unit overlaying the scheduled advertisement.

11. The method of claim 9 wherein the step of displaying the synchronized assigned targeted advertisement on a display unit comprises replacing the scheduled advertisement on the display unit with the assigned targeted advertisement.

12. The method of claim 9 wherein the audience preference comprises at least one of an audience location, an audience profile, and an audience interest.

13. The method of claim 9 wherein the merchant preference comprises at least one of a merchant location, a merchant target audience, and a merchant preferred time to transmit the merchant advertisement to the audience.

14. The method of claim 9 wherein the step of assigning the targeted advertisement with a merchant advertisement is further based on an audience viewing habits.

15. The method of claim 9 wherein the step of assigning the targeted advertisement with a merchant advertisement is further based on an analysis of the audience's viewing habit of a regular programming by monitoring the frequency of the audience viewing the regular programming, the regular programming being the program being broadcasted from the broadcasting station with the scheduled advertisement.

16. The method of claim 9 further comprising the step of generating a coupon associated to the assigned targeted advertisement.

17. The method of claim 16 wherein the step of generating a coupon associated to the assigned targeted advertisement comprises electronically transmitting the coupon to the audience.

18. The method of claim 16 wherein the step of generating a coupon associated to the assigned targeted advertisement comprises selecting the coupon based on the audience preference.

19. The method of claim 9 wherein the step of assigning the targeted advertisement with a merchant advertisement comprises assigning the targeted advertisement with a merchant advertisement if the merchant preference of the merchant advertisement at least partially matches the audience preference.

* * * * *